United States Patent [19]

Numata et al.

[11] Patent Number: 5,383,174
[45] Date of Patent: Jan. 17, 1995

[54] OPTICAL DISK APPARATUS

[75] Inventors: Tomiyuki Numata, Tenri; Takeshi Yamaguchi, Sakai; Takashi Iwaki, Nara, all of Japan

[73] Assignee: Sharp Kabushiki Kaisha, Osaka, Japan

[21] Appl. No.: 998,736

[22] Filed: Dec. 30, 1992

[30] Foreign Application Priority Data

Jan. 7, 1992 [JP] Japan ................. 4-000612

[51] Int. Cl.⁶ .............................................. G11B 7/00
[52] U.S. Cl. ..................... 369/119; 369/116; 369/44.25
[58] Field of Search .............. 369/100, 114, 115, 116, 369/119, 120, 124, 44.11, 44.14, 44.17, 44.22, 44.21, 44.25, 44.28, 44.29, 44.31, 44.33; 250/201.5

[56] References Cited

U.S. PATENT DOCUMENTS 4,544,241 10/1985 LaBudde et al. ............. 350/486
4,556,964 12/1985 Trethewey .................. 369/44
4,607,356 8/1986 Bricot et al. ............... 369/119
4,669,072 5/1987 Miura et al. ............... 369/54

FOREIGN PATENT DOCUMENTS

2-161625 6/1990 Japan .
2-086092 5/1982 United Kingdom .

*Primary Examiner*—Paul M. Dzierzynski
*Assistant Examiner*—Don Wong

[57] ABSTRACT

An optical disk apparatus has a galvanic mirror error signal generation circuit for detecting that the galvanic mirror rotates more than an allowed limit value in directions P and Q. When it is detected by the galvanic mirror error signal generation circuit that the galvanic mirror rotates more than the allowed limit value, the light intensity of the light spot is changed from the recording-use (or erasing-use) light intensity into the reproducing-use light intensity. Accordingly, recording and erasing of information is always carried out by the projection of the light beam having a predetermined light intensity, thereby always providing a high grade of optical disk apparatus.

21 Claims, 6 Drawing Sheets

OPTICAL DISK APPARATUS

FIELD OF THE INVENTION

The present invention relates to an optical disk apparatus which carries out recording, erasing, and reproducing of information with respect to a recording medium by always projecting the light having a predetermined light intensity.

BACKGROUND OF THE INVENTION

An optical disk has been well known as a recording medium for use in an optical disk apparatus. The surface of the optical disk is spirally or concentrically provided with a plurality of tracks. When the optical disk apparatus is loaded with the optical disk, a light beam is led so as to be converged onto the track by an optical system of an optical pickup, thereby forming a light spot on the track. According to the projection of the light spot, the recording, erasing, and reproducing of information is carried out with respect to a target track.

The light spot should be converged on the desired track in accuracy in order that the above-mentioned optical apparatus carries out recording, erasing, and reproducing of information respectively in accuracy. To meet this requirement, the optical disk apparatus is generally arranged such that (1) a focussing control by which the light spot can accurately be focussed on the track and (2) a tracking control by which the light spot can accurately track the desired track are concurrently carried out.

A galvanic mirror may be used as a means for changing the position of the light spot by the use of the above mentioned tracking. The following deals with a magneto-optical disk apparatus having a separate-type pickup, which is a conventional optical disk apparatus, with reference to FIGS. 6 and 7.

Figure 7:
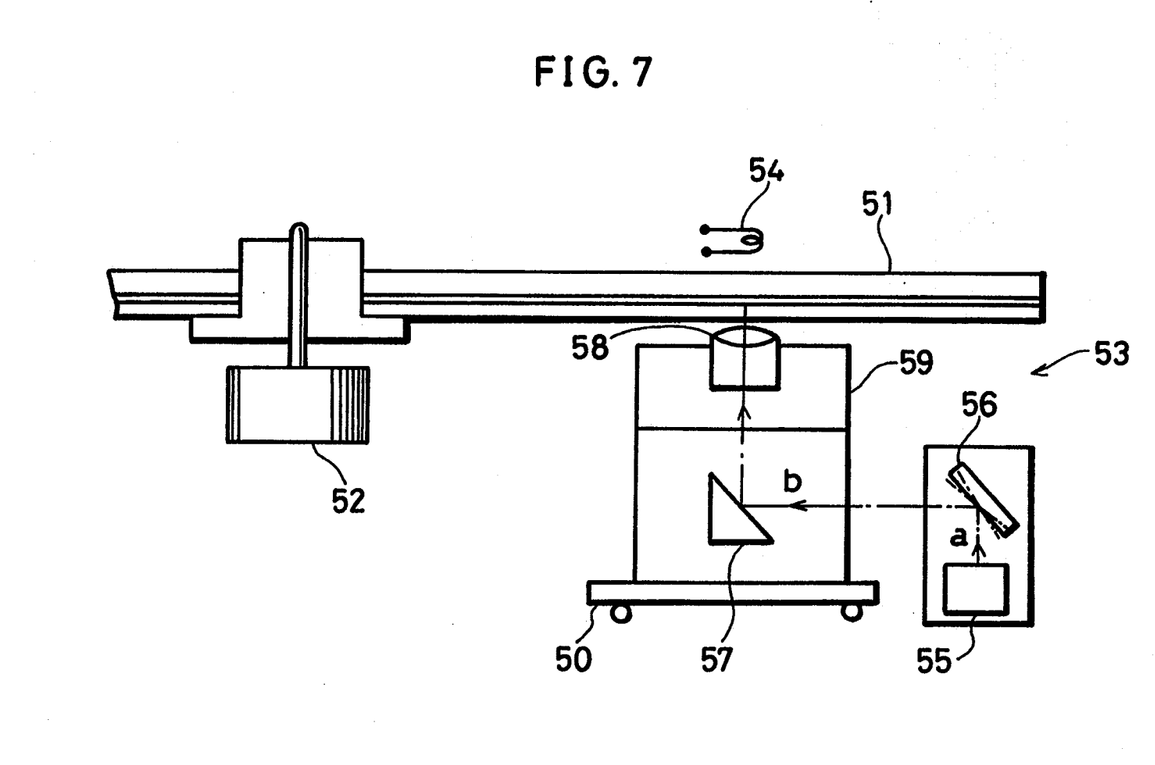
FIG. 7 is a block diagram showing the structure of the conventional magneto-optical disk apparatus.

FIG. 7 shows a schematic diagram showing the magneto-optical disk apparatus having the separate-type pickup. As shown in FIG. 7, a magneto-optical disk 51 is controlled by a motor 52 so as to rotate at either a predetermined linear velocity of a predetermined angular velocity. An optical head 53 leads the light beam onto the magneto-optical disk 51 through an object glass 58 during recording, erasing, and reproducing of information. The optical head 53 also converges the reflected light of the magneto-optical disk 51 through the object glass 58. The reflected light bears a reproduced signal therein. During recording or erasing, a coil 54 applies a magnetic field to a surface of the magneto-optical disk 51 which is opposite to the other surface where the light beam is projected. The magnetization direction of a magnetic layer is reversed by the magnetic field application of the coil 54. The magnetic layer is located in the substantially middle of the magneto-optical disk 51 (see FIG. 7). Note that the magnetization direction varies depending on the direction of the current applied to the coil 54.

The optical head 53 is composed of the first block and the second block. The first block is mainly provided with a galvanic mirror 56 for changing an optical path so that a light beam which is projected vertically upward (direction a of FIG. 7) from a laser light source 55 having a semiconductor laser therein directs to a direction (direction b of FIG. 7) perpendicular to direction a. The second block is mainly provided with (1) the object glass 58, (2) a mirror 57 for directing the light beam, which is changed in its optical path by the galvanic mirror 56, to the object glass 58, and (3) an object glass driving device 59.

The galvanic mirror 56 is composed of a mirror section and a mirror driving section. The mirror driving section is arranged so as to rotate the mirror section around an axis extending to the direction perpendicular with respect to the paper surface of FIG. 7. With the arrangement, a fine adjustment (i.e., tracking control) of the light spot formed on the magneto-optical disk 51 with respect to the radial direction of the magneto-optical disk 51, is carried out.

The second block is movable by a linear motor 50 with respect to the radial direction of the magneto-optical disk 51. The semiconductor laser of the laser light source 55 projects the laser light beam having a bad temperature characteristic. So, the automatic power control of the outgoing beam from the semiconductor laser is carried out such that the outgoing beam from the semiconductor laser becomes stable.

Figure 6:
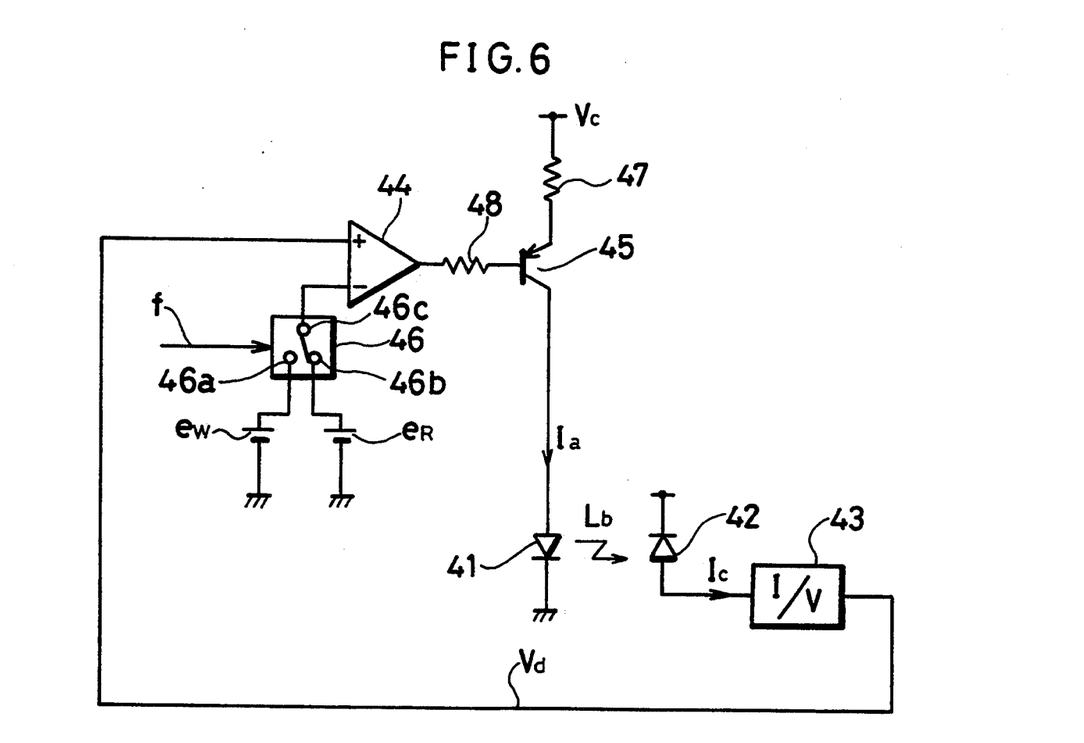
FIG. 6 is a circuit diagram showing one example for the automatic power control of the outgoing light beam intensity, FIG. 6 showing both the conventional and present cases.

The following deals with the automatic power control of the outgoing beam with reference to FIG. 6.

As shown in FIG. 6, a semiconductor laser 41 is driven by collector current $I_a$ of a transistor 45 such that the light intensity of outgoing beam $L_b$ becomes strong when collector current $I_a$ increases while the light intensity of outgoing beam $L_b$ becomes weak when collector current $I_a$ decreases. The transistor 45 is driven by a differential amplifier 44. More specifically, collector current $I_a$ of the transistor 45 varies depending on an output signal of the differential amplifier 44.

Outgoing beam $L_b$ of the semiconductor laser 41 directs to a photodetector 42. The photodetector 42 outputs current $I_c$ which varies depending on the incident beam $L_b$. Current $I_c$ is outputted to current/voltage (I/V) converting circuit 43. The current/voltage converting circuit 43 converts current $I_c$ inputted thereto into corresponding voltage $V_d$ to output thereof.

Voltage $V_d$ is outputted to a non-inverting input terminal of the differential amplifier 44. An inverting input terminal of the differential amplifier 44 is connected to a common terminal 46c of a switch circuit 46. Reference voltage $e_R$ corresponding to the reproduction operation is applied to a contact point 46b of the switch circuit 46. In contrast, reference voltage $e_W$ corresponding to the recording and erasing operations is applied to a contact point 46a of the switch circuit 46.

Note that the respective reference voltages $e_R$ and $e_W$ are set so as to satisfy the relation therebetween, $e_W > e_R$. The switching of the switch circuit 46 is controlled in response to control signal f from a control device such as CPU. Moreover, an output signal of the differential amplifier 44 is connected to a base of the transistor 45 through a resistor 48 for limiting the current therethrough. An emitter of the transistor 45 is connected to power source $V_c$ through a resistor 47.

With the arrangement, the differential amplifier 44 carries out the differential amplifying with respect to voltage $V_d$ and reference voltage $e_W$ during recording and erasing of information. And, when voltage $V_d$ is greater than reference voltage $e_W$, the output signal of the differential amplifier 44 increases, thereby increasing the base voltage of the transistor 45 and decreasing collector current $I_a$. Accordingly, the light intensity of outgoing beam $L_b$ of the semiconductor laser 41 becomes weak and current $I_c$ decreases, thereby decreasing voltage $V_d$. In contrast, when $V_d < e_W$ is satisfied, the output signal of the differential amplifier 44 decreases. And, the base voltage of the transistor 45 decreases, so collector current $I_a$ increases. Accordingly, the light intensity of outgoing beam $L_b$ of the semiconductor laser 41 becomes strong and current $I_c$ increases, thereby increasing voltage $V_d$. By repeating the above mentioned procedures, the light intensity of outgoing beam $L_b$ of the semiconductor laser 41 is controlled such that voltage $V_d$ substantially coincides with reference voltage $e_W$.

The differential amplifier 44 also carries out the differential amplifying with respect to voltage $V_d$ and reference voltage $e_R$ during reproducing of information. And, when voltage $V_d$ is greater than reference voltage $e_W$, the output signal of the differential amplifier 44 increases, thereby increasing the base voltage of the transistor 45 and decreasing collector current $I_a$. Accordingly, the light intensity of outgoing beam $L_b$ of the semiconductor laser 41 becomes weak and current $I_c$ decreases, thereby decreasing voltage $V_d$. In contrast, when $V_d < e_R$ is satisfied, the output signal of the differential amplifier 44 decreases. And, the base voltage of the transistor 45 decreases, so collector current $I_a$ increases. Accordingly, the light intensity of outgoing beam $L_b$ of the semiconductor laser 41 becomes strong and current $I_c$ increases, thereby increasing voltage $V_d$. By repeating the above mentioned procedures, the light intensity of outgoing beam $L_b$ of the semiconductor laser 41 is controlled such that voltage $V_d$ substantially coincides with reference voltage $e_R$.

Figures 8A, 8B:
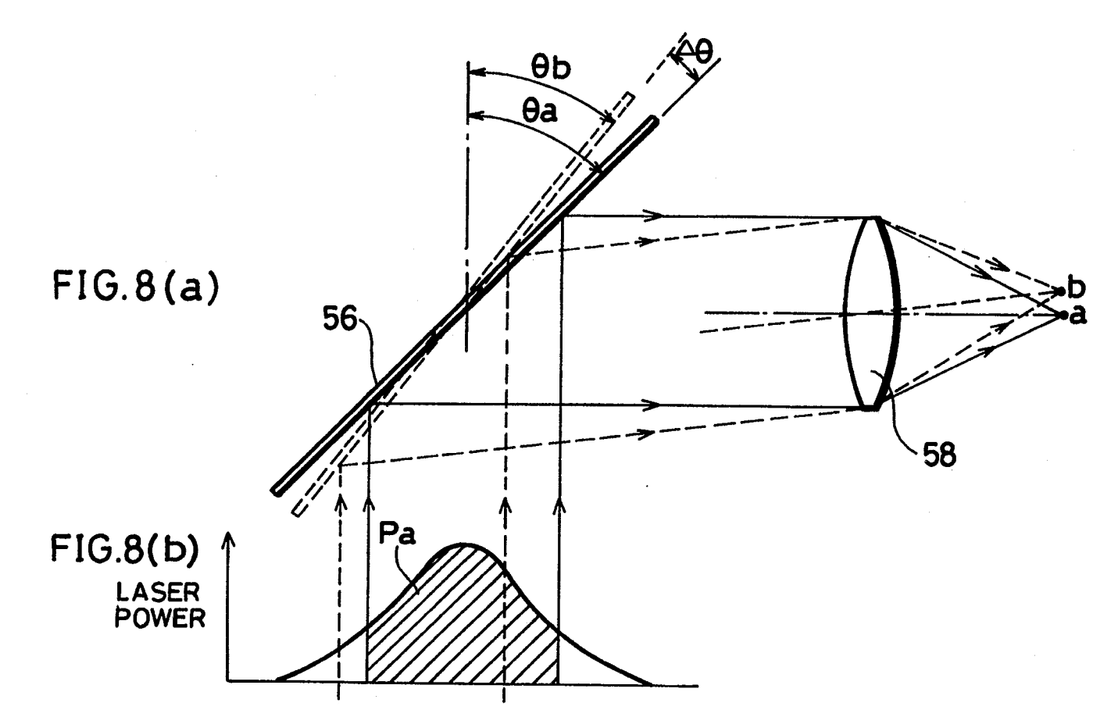
FIGS. 8(a), 8(b) and 8(c) are explanatory diagrams showing the problem of the magneto-optical disk apparatus of FIG. 7.
Figure 8C:
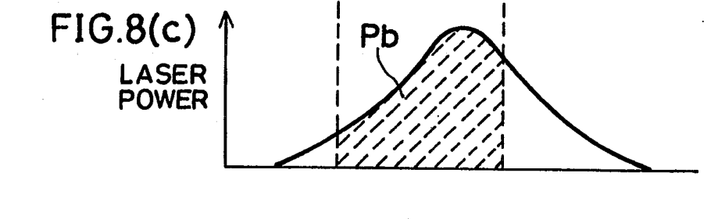

As mentioned above, the semiconductor laser 41 projects light beams having the respective predetermined light intensities of outgoing beam $L_b$ corresponding to recording, erasing, and reproducing of information. However, when the tracking control is carried out by the use of the galvanic mirror 56, there presents the problem that the light intensity of the light spot focussed on the optical disk fluctuates, due to the fact that the light beam is kicked off by the object glass 58 when the galvanic mirror 56 rotates, though it is provided that the light intensity of the outgoing beam is kept constant. The following deals with the fluctuation of the light intensity of the light spot focussed on the optical disk with reference to FIG. 8.

When a light beam, which has the distribution (Gaussian distribution) of the outgoing light beam intensity with respect to the cross-sectional direction like FIG. 8(b), is directed to the galvanic mirror 56, the light beam is reflected like the solid line of FIG. 8(a) and thereafter is converged by the object glass 58 onto the optical disk (not shown), thereby forming a ;light spot a on the optical disk. Note that cross-sectional area Pa of the slanting line of FIG. 8(b) corresponds to the light intensity of the light spot a. In that case, the rotation angle of the galvanic mirror 56 with respect to the vertical direction is expressed as $\theta a$.

Meanwhile, it is assumed that the rotation angle decreases by $\Delta\theta$ and becomes $\theta b$ after the galvanic mirror 56 rotates in accordance with the tracking control. In that case, the light beam is reflected by the galvanic mirror 56 (see the dashed line of FIG. 8(a)) and thereafter the light beam is converged onto the optical disk so as to form a light spot b through the object glass 58. Note that cross-sectional area Pb of the dashed slanting line of FIG. 8(c) corresponds to the light intensity of the light spot b.

Accordingly, though the outgoing light beam intensity of the semiconductor laser is stabilized like above by the automatic power control, the light intensity of the light spot formed on the optical disk changes according to the change of the rotation angle of the galvanic mirror 56 due to the tracking control operation. Therefore, recording, erasing, and reproducing of information can not be achieved under the projection condition of the optimum light spot, thereby resulting in the serious problem that the reliability with respect to the recorded information decreases and thereby resulting in the serious problem that information can not perfectly erased during erasing operation.

SUMMARY OF THE INVENTION

In order to meet the above mentioned deficiencies, it is an object of the present invention to provide an optical disk apparatus which can always form a light spot having a predetermined light intensity on a target track.

In order to achieve the foregoing object, the present invention is characterized by comprising:

optical path changing means (such as a galvanic mirror) for changing an optical path of a light beam by rotation, thereby leading the light beam to a recording medium;

error detection means for detecting a rotation angle of the optical path changing means, and for outputting an error signal upon detecting that the rotation angle of the optical path changing means does not fall in a predetermined range; and control means for controlling the apparatus such that the apparatus stops recording and erasing of information in response to the error signal.

With the arrangement of the present invention, the light beam is led onto the target track by the rotation of the optical path changing means. In that case, when the error detection means detects that the rotation angle of the optical path changing means does not fall in the predetermined range, the error signal is outputted from the error detection means. The control means stops recording or erasing operation, which is now being carried out, upon reception of the error signal.

When the rotation angel of the optical path changing means falls in the predetermined range, the control means releases the optical path changing means from stopping of the recording or erasing operation. More specifically, when the rotation angle of the optical path changing means falls in the predetermined range, the error signal is not outputted to the control means. Then, the optical path changing means keeps its optimum rotation angle. Accordingly, the light intensity of the light beam doe snot change and the light beam having the optimum light intensity is always led to the track, thereby carrying out the stable recording and erasing of information.

Namely, it is not likely occurred that the light beam having the light intensity which does not fall in the predetermined range is not led onto the track, thereby avoiding the bad recording and bad erasing before they occur.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention:

FIGS. 4(a) and 4(b) are explanatory diagrams showing how rotation angle detection signal $V_s$ of the optical disk apparatus varies depending on the change of the galvanic mirror, wherein FIG. 4(a) shows the relation between the rotation angle of the galvanic mirror and the light intensity of the light spot converged on the optical disk, and FIG. 4(b) shows the relation between the rotation angle of the galvanic mirror and rotation angle detection signal $V_s$;

DESCRIPTION OF THE EMBODIMENTS

The following description describes one preferred embodiment of the present invention with reference to FIGS. 1 through 6.

Figure 1:
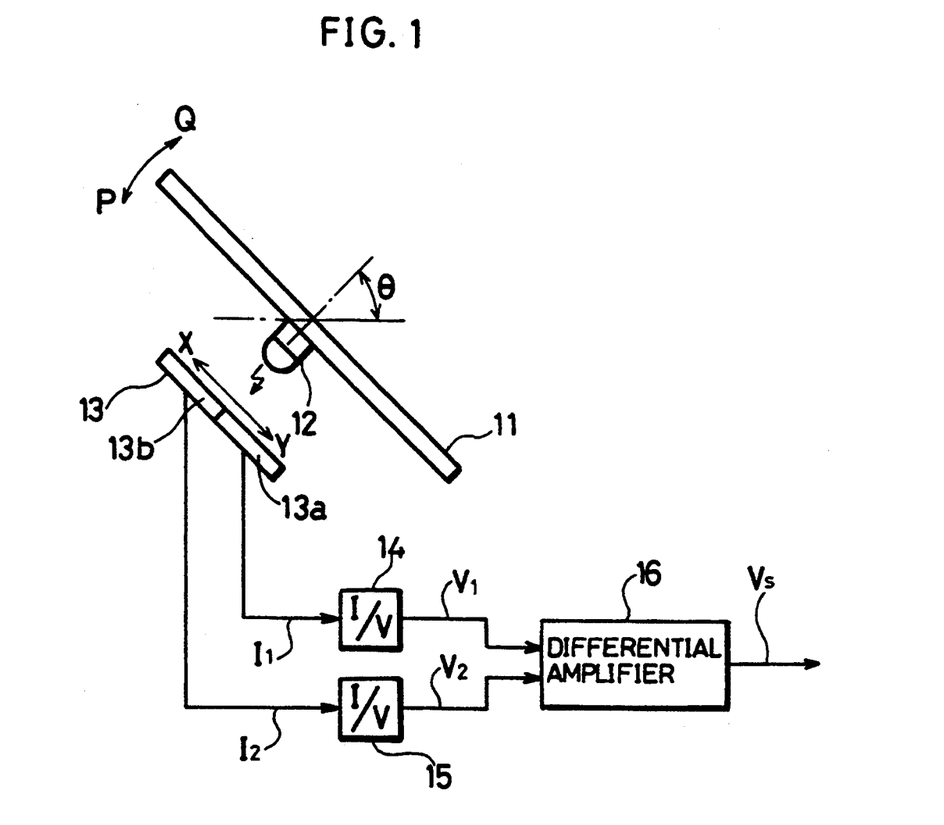
FIG. 1 is a block diagram showing the main structure of an optical disk apparatus of the present invention.

An optical disk apparatus of the present embodiment, as shown in FIG. 1, has a galvanic mirror 11 (optical path changing means). The galvanic mirror 11 is composed of a mirror section and a mirror driving section. The mirror driving section is arranged so as to rotate the mirror section around an axis extending to a direction perpendicular to the paper surface of FIG. 1. With the arrangement, a fine adjustment (i.e., tracking control) of a light spot formed on an optical disk (not shown) with respect to the radial direction, is carried out.

A light emitting element device 12 such as an LED (Light Emitting Diode) is provided on a surface which is opposite to a mirror surface where the light beam is projected. The light emitting element device 12 is driven by a driving circuit (not shown) so as to emit the light. A two-divided photodetector 13 (light receiving element device) is fixed so as to be opposite to the light emitting element device 12 with a predetermined distance therebetween. The light projected from the light emitting element device 12 is directed to the two-divided photodetector 13. The two-divided photodetector 13 converts the incident light into current signals which vary depending on the incident light.

The two-divided photodetector 13 has a light receiving section 13a and a light receiving section 13b. Output current $I_1$ of the light receiving section 13a is outputted to a current/voltage converting circuit 14 while output current $I_z$ of the light receiving section 13b is outputted to a current/voltage converting circuit 15. The current/voltage converting circuit 14 converts output current $I_1$ of the light receiving section 13a into voltage $V_1$ which varies depending on output current $I_1$, while the current/voltage converting circuit 15 converts output current $I_z$ of the light receiving section 13b into voltage $V_z$ which varies depending on output current $I_z$.

Output currents $I_1$ and $I_z$ are changed in response to the rotation of the galvanic mirror 11 with respect to a direction indicating arrow PQ of FIG. 1, i.e., in response to rotation angle $\theta$. The following deals with the change of output currents $I_1$ and $I_z$ with reference to FIGS. 2 and 3.

Figure 2:
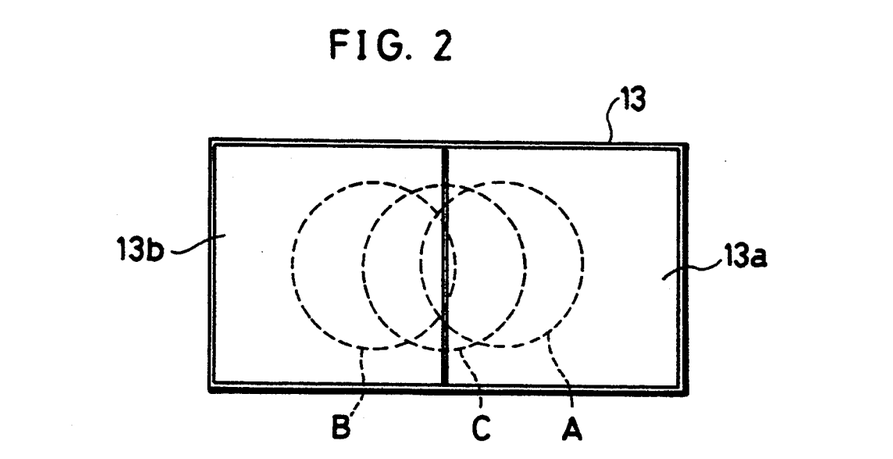
FIG. 2 is an enlarged explanatory diagram showing the two-divided photodetector of FIG. 1.
Figure 3:
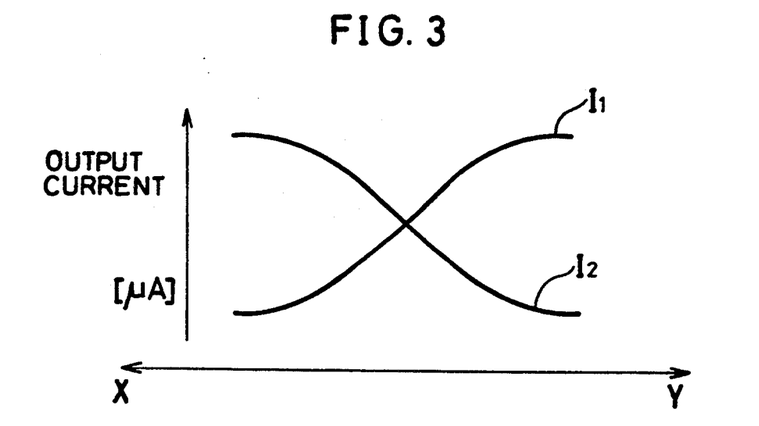
FIG. 3 is an explanatory diagram showing how the output currents of the two-divided photodetector of FIG. 2 vary depending on the positions thereof.

As shown in FIG. 2, when the light projected from the light emitting element device 12 to the light receiving sections 13a and 13b has a shape of circle C, this ensures that the galvanic mirror 11 is opposite in parallel to the two-divided photodetector 13. More specifically, a partition line of the light receiving sections 13a and 13b is located on a line extending to the center of the light emitting element device 12. In that case, output current $I_1$ of the light receiving section 13a coincides with output current $I_z$ of the light receiving section 13b (see FIG. 3, the point of intersection of output current $I_1$ and output current $I_z$). Thus voltage $V_1$ coincides with voltage $V_z$.

When the galvanic mirror 11 rotates with respect to direction Q such that rotation angle $\theta$ is smaller than that of FIG. 1, the light emitting element device 12 moves in direction X of FIG. 1. Therefore, the light projected from the light emitting element device 12 is directed more to the light receiving section 13b than to the light receiving section 13a (see circle B of FIG. 2). In that case, output currents $I_1$ and $I_z$ of the light receiving sections 13a and 13b are respectively changed like FIG. 3.

In contrast, when the galvanic mirror 11 rotates with respect to direction P such that rotation angle $\theta$ is greater than that of FIG. 1, the light emitting element device 12 moves in direction Y of FIG. 1. Therefore, the light projected from the light emitting element device 12 is directed more to the light receiving section 13a than to the light receiving section 13b (see circle A of FIG. 2). In that case, output currents $I_1$ and $I_z$ of the light receiving sections 13a and 13b are respectively changed like FIG. 3.

Note that above mentioned directions X and Y correspond to a direction perpendicular to the partition line of the light receiving sections 13a and 13b.

Above mentioned voltages $V_1$ and $V_z$ are outputted to a differential amplifier 16. The differential amplifier 16 amplifies the difference between voltages $V_1$ and $V_z$, and outputs the resultant signal as rotation angle detection signal $V_s$. The effect, due to the same components of the stray light which are directed to the light receiving sections 13a and 13b respectively, is removed since the differential amplifier 16 amplifies the difference between voltages $V_1$ and $V_z$ like above.

Figure 4A:
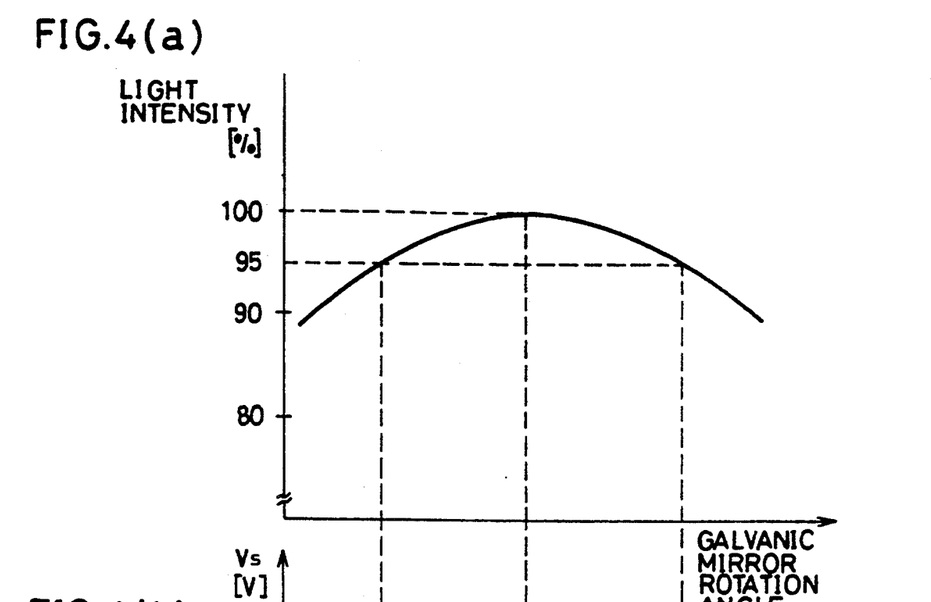
Figure 4B:
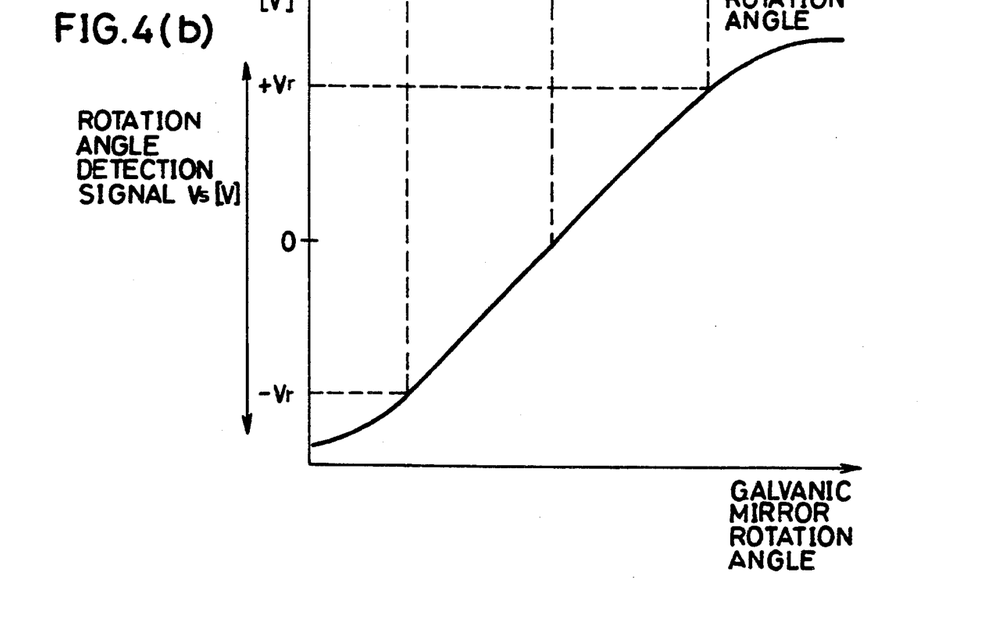

The following deals with how rotation angle detection signal $V_x$ changes in response to the rotation of the galvanic mirror with reference to FIG. 4.

FIG. 4(a) shows the relation between the rotation angle of the galvanic mirror and the light intensity of the light spot converged on the optical disk. FIG. 4(b) shows the relation between the rotation angle of the galvanic mirror and rotation angle detection signal $V_s$. As shown in FIG. 4(a), it is standardized such that the maximum light intensity of the light spot corresponds to the light intensity of 100 percent. This standardized light intensity is used as a predetermined light intensity for recording and erasing of information. In that case, as shown in FIG. 4(b), an offset circuit (not shown) adjusts rotation angle detection signal $V_s$ so as to become zero voltage. Note that $+V_r$ and $-V_r$ are the rotation angle detection signal which corresponds to an allowed limit value (for example 5 percent) of the change of the light spot intensity in the optical disk apparatus of the present embodiment during recording and erasing operations.

Figure 5:
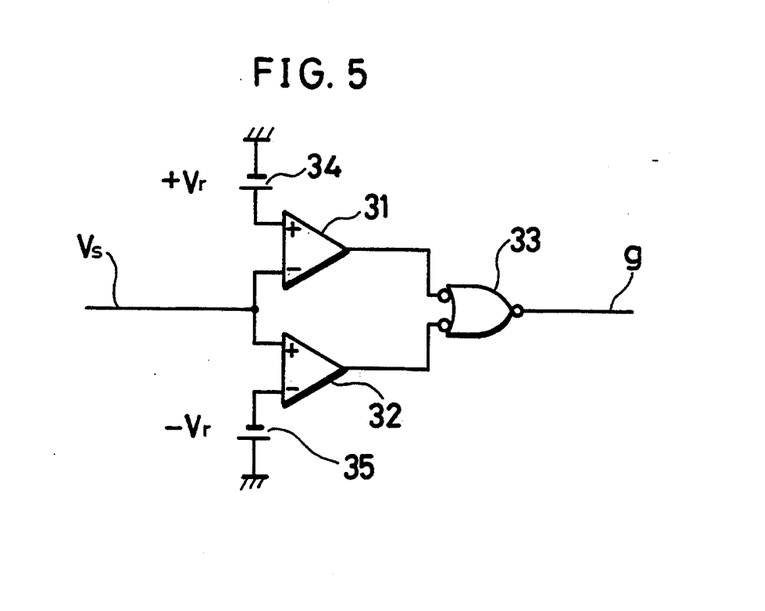
FIG. 5 is a circuit diagram showing one example of a galvanic mirror error signal generation circuit of the present invention for detecting that the galvanic mirror rotates more than an allowed limit value.

With reference to FIG. 5, the following deals with how the optical disk apparatus of the present invention works when the galvanic mirror 11 rotates more than the above mentioned allowed limit value in directions P and Q.

FIG. 5 is a circuit diagram showing one example of a galvanic mirror error signal generation circuit (error detection means) for detecting that the galvanic mirror 11 rotates more than the above mentioned allowed limit value in directions P and Q. The galvanic mirror error signal generation circuit is mainly composed of (1) a reference voltage generation device 34 which outputs a reference voltage of $+V_r$, (2) a reference voltage generation device 35 which outputs a reference voltage of $-V_r$, (3) a comparator 31 for comparing rotation angle detection signal $V_s$ to $+V_r$, (4) a comparator 32 for comparing rotation angle detection signal $V_s$ to $-V_r$, and an AND circuit 33 for carrying out the logical multiply operation with respect to output signals of the comparators 31 and 32, and for outputting the resultant logical multiply as galvanic mirror error signal g.

As shown in FIG. 5, rotation angle detection signal $V_s$ is applied to an inverting input terminal of the comparator 31 and is also applied to a non-inverting input terminal of the comparator 32. Reference voltage $+V_r$ is applied to a non-inverting input terminal of the comparator 31 by the reference voltage generation device 34. Reference voltage $-V_r$ is applied to an inverting input terminal of the comparator 32 by the reference voltage generation device 35. Output signal of the comparator 31 is outputted to an input terminal of the AND circuit 33 while output signal of the comparator 32 is outputted to the other input terminal of the AND circuit 33.

For example, when the galvanic mirror 11 rotates within the allowed limit value in direction P or Q, i.e., rotation angle detection signal $V_s$ is smaller than $+V_r$ and greater than $-V_r$ ($-V_r < V_s < +V_r$), the output signal of the comparator 31 becomes a high level and the output signal of the comparator 32 also becomes the high level. Accordingly, galvanic mirror error signal g of the AND circuit 33 becomes the high level.

In contrast, when the galvanic mirror 11 rotates more than the allowed limit value in direction P or Q, rotation angle detection signal $V_s$ is greater than the absolute value of $V_r$. For example, when rotation angle detection signal $V_s$ is greater than $+V_r$ ($V_s > +V_r$), the output signal of the comparator 31 becomes a low level and the output signal of the comparator 32 becomes the high level. Accordingly, galvanic mirror error signal g of the AND circuit 33 becomes the low level. On the contrary, when rotation angle detection signal $V_s$ is smaller than $-V_r$ ($-V_r > V_s$), the output signal of the comparator 31 becomes the high level and the output signal of the comparator 32 becomes the low level. Accordingly, galvanic mirror error signal g of the AND circuit 33 becomes the low level.

In addition, the light spot having the predetermined light intensity is converged on the target track when galvanic mirror error signal g is the high level. And, the light spot having smaller light intensity than the predetermined light intensity is converged on the target track when galvanic mirror error signal g is the low level.

More specifically, a control device (not shown) such as CPU monitors galvanic mirror error signal g. When the control device detects that galvanic mirror error signal g changes from the high level to the low level (i.e., some error is occurred), the control device outputs control signal f to a switch circuit 46 (control means) of FIG. 6. The switch circuit 46 switches from a contact point 46a to a contact point 46b in response to control signal f. As mentioned earlier, reference voltage $e_R$ is applied to the inverting input terminal of the differential amplifier 44. Accordingly, the light intensity of outgoing beam $L_b$ of the semiconductor laser 41 is controlled such that voltage $V_d$ substantially coincides with reference voltage $e_R$. Therefore, the light spot converged on the disk is switched so as to have the reproducing-use light intensity, thereby stopping the recording operation and erasing operation.

Thereafter, when the galvanic mirror 11 rotates in directions P and Q such that rotation angle detection signal $V_s$ is again within the above mentioned allowed limit value, the switch circuit 46 switches from the contact point 46b to the contact point 46a, thereby applying reference voltage $e_W$ to the inverting input terminal of the differential amplifier 44. Accordingly, the light intensity of outgoing beam $L_b$ of the semiconductor laser 41 is controlled such that voltage $V_d$ substantially coincides with reference voltage $e_W$, thereby restarting the recording operation or erasing operation.

Note that the switching of the switch circuit 46 may be directly made according to galvanic mirror error signal g instead of through the control device. Note also that the projection of outgoing beam $L_b$ may be stopped upon detection of the occurrence of error instead of changing the light intensity of outgoing beam $L_b$ to the reproducing-use one.

With the arrangement, when the galvanic mirror 11 rotates more than the allowed limit value in directions P and Q, the light spot converged on the optical disk is switched so as to have the reproducing-use light intensity, thereby stopping the recording operation or erasing operation. Thereafter, when rotation angle detection signal $V_s$ is again within the above mentioned allowed limit value, the recording or erasing operation is restarted.

As mentioned above, according to the present embodiment, there is provided the galvanic mirror error signal generation circuit for detecting that the galvanic mirror 11 rotates more than the allowed limit value in directions P and Q. Therefore, when the galvanic mirror 11 rotates more than the allowed limit value, the light intensity of the light spot is switched from the recording-use (or erasing-use) light intensity to the reproducing-use one according to the switching of the switch circuit 46. Thus, it is always avoidable to carry out recording and erasing of information by the use of the light spot having an inappropriate light intensity, thereby providing a high grade of optical disk apparatus.

Note that the above mentioned control is carried out not only for the case where the galvanic mirror 11 rotates extraordinarily during recording and erasing of information but also for the case where the galvanic mirror 11 rotates extraordinarily during reproducing of information. More specifically during reproducing of information. More specifically, when it is detected that the galvanic mirror 11 rotates more than the allowed limit value in directions P and Q, the reproducing operation is suspended. Accordingly, the reliability of reproducing operation is improved.

Note also that the above mentioned embodiment deals with the case where the rotation angle of the galvanic mirror 11 is detected by the light emitting element device 12 and the two-divided photodetector 13. However, the present invention is not restricted to this example. Namely, the rotation angle of the galvanic mirror 11 may be detected by other means such as a PSD (Position Sensing Device) ad a mechanical position detector.

The present invention, as mentioned above, is composed of optical path changing means for changing an optical path of a light beam by rotation, thereby leading the light beam to a recording medium;
  error detection means for detecting a rotation angle of said optical path changing means, and for outputting an error signal upon detecting that the rotation angle of said optical path changing means does not fall in a predetermined range; and
  control means for controlling the apparatus such that the apparatus stops recording and erasing of information in response to the error signal.

Therefore, the light beam having the optimum light intensity is led onto the target track only when the optical path changing means falls in the predetermined range. Thus, the light intensity of the light beam does not change, thereby stably carrying out recording and erasing of information. So, it is avoidable to badly record and erase information since the light beam having the light intensity which is distributed within the predetermined range is only led to the track. Accordingly, the reliability of recording of information can be remarkably improved and the perfect erasure of information during erasing operation can be achieved.

There are described above normal features which the skilled man will appreciate give rise to advantages. These are each independent aspects of the invention to be covered by the present application, irrespective of whether or not they are included within the scope of the following claims.

What is claimed is:

1. An optical disk apparatus comprising:
  optical path changing means for changing an optical path of a light beam by rotating said changing means, thereby leading the light beam onto a recording medium;
  error detection means for detecting a rotation angle of said optical path changing means, and for outputting an error signal upon detecting that the rotation angle of said optical path changing means does not fall in a predetermined range; and
  control means for controlling said apparatus such that said apparatus stops recording and erasing of information in response to the error signal.

2. The optical disk apparatus as set forth in claim 1, wherein said optical path changing means includes galvanic mirror means having a reflecting surface from which the light beam is reflected and an opposite surface which is opposite to said reflecting surface, further comprising:
  light emitting means, on said opposite surface, for projecting light; and
  light receiving means for receiving the light from said light emitting means, and for outputting a current signal which varies depending on an incident light intensity, said light receiving means being fixed so as to have a predetermined distance away from said light emitting means.
  wherein said error detection means detects the rotation angle of said galvanic mirror means according to the current signal from said light receiving means.

3. The optical disk apparatus as set forth in claim 1, wherein said optical path changing means includes galvanic mirror means having a reflecting surface from which the light beam is reflected and an opposite surface which is opposite to said reflecting surface, further comprising:
  light emitting means, on said opposite surface, for projecting light;
  light receiving means for receiving the light from said light emitting means, said light receiving means being fixed so as to have a predetermined distance away from said light emitting means, said light receiving means being divided into a first and second light receiving devices by a partition line, current signals, which vary depending on respective incident light intensities, being respectively outputted from said first and second light receiving devices;
  first converter means for converting the current signal from said first light receiving device into a first voltage signal;
  second converter means for converting the current signal from said second light receiving device into a second voltage signal; and
  differential amplifying means for differentially amplifying between the first and second voltage signals,
  wherein said error detection means outputs the error signal upon detecting that an output signal of said differential amplifying means does not fall in the predetermined range.

4. The optical disk apparatus as set forth in claim 3, wherein said error detection means includes means for comparing the output signal of said differential amplifying means with a reference signal, and outputs the error signal according to the compared result.

5. The optical disk apparatus as set forth in claim 3, wherein said control means includes:
  third reference voltage generation means for generating a third reference voltage corresponding to a light beam intensity of recording and erasing operations;
  fourth reference voltage generation means for generating a fourth reference voltage corresponding to a light beam intensity of reproducing operation;
  switch circuit means for switching from the third reference voltage to the fourth reference voltage upon reception of the error signal; and
  means for carrying out automatic power control of the light beam which is projected onto the recording medium in accordance with an output signal of said switch circuit means.

6. The optical disk apparatus as set forth in claim 1, wherein said optical path changing means includes galvanic mirror means having a reflecting surface from which the light beam is reflected and an opposite surface which is opposite to said reflecting surface, further comprising:

light emitting means, on said opposite surface, for projecting light;

light receiving means for receiving the light from said light emitting means, said light receiving means being fixed so as to have a predetermined distance away from said light emitting means, said light receiving means being divided into a first and second light receiving devices by a partition line, current signals, which vary depending on respective incident light intensities, being respectively outputted from said first and second light receiving devices, said partition line extending to a direction substantially perpendicular to a rotation direction of said galvanic mirror means;

first converter means for converting the current signal from said first light receiving device into a first voltage signal;

second converter means for converting the current signal from said second light receiving device into a second voltage signal;

differential amplifying means for differentially amplifying between the first and second voltage signals;

first reference voltage generation means for generating a first reference voltage;

second reference voltage generation means for generating a second reference voltage;

first comparator means for comparing an output signal of said differential amplifying means with the first reference voltage;

second comparator means for comparing an output signal of said differential amplifying means with the second reference voltage; and logical multiply operating means for operating logical multiply with respect to output signals of said first and second comparator means, wherein an output signal of said logical multiply operating means corresponds to the error signal.

7. The optical disk apparatus as set forth in claim 1 is used for recording, erasing, and reproducing of information to or from a magneto-optical disk.

8. The optical disk apparatus as set forth in claim 1, wherein a predetermined range is specified such that the light intensity of the light beam projected onto the recording medium changes within a range of five (5) percent.

9. An optical disk apparatus comprising:

light projecting means for projecting a first and second light beams, the first light beam being for recording and erasing of information, the second beam being for reproducing of information;

optical path changing means for changing an optical path of the light beams by rotating said changing means, thereby leading the respective light beams onto a recording medium;

error detection means for detecting a rotation angle of said optical path changing means, and for outputting an error signal upon detecting that the rotation angle of said optical path c hanging means does not fall in a predetermined range; and control means for controlling said light projecting means, upon reception of the error signal during recording and erasing of information, so as to project the second light beam onto the recording medium in stead of the first light beam.

10. The optical disk apparatus as set forth in claim 9, wherein said control means controls said apparatus, upon reception of the error signal during reproducing of information, so as to stop the reproducing of information.

11. The optical disk apparatus as set forth in claim 9, wherein said control means controls said light projecting means, upon reception of the error signal during reproducing of information, so as to project no light beam onto the recording medium.

12. The optical disk apparatus as set forth in claim 9, wherein said optical path changing means includes galvanic mirror means having a reflecting surface from which the light beam is reflected and an opposite surface which is opposite to said reflecting surface, further comprising:

light emitting means, on said opposite surface, for projecting light; and light receiving means for receiving the light from said light emitting means, and for outputting current signal which varies depending on an incident light intensity, said light receiving means being fixed so as to have a predetermined distance away from said light emitting means, wherein said error detection means detects the rotation angle of said galvanic mirror means according to the current signal from said light receiving means.

13. The optical disk apparatus as set forth in claim 9, wherein said optical path changing means includes galvanic mirror means having a reflecting surface from which the light beam is reflected and an opposite surface which is opposite to said reflecting surface, further comprising:

light emitting means, on said opposite surface, for projecting light;

light receiving means for receiving the light from said light emitting means, said light receiving means being fixed so as to have a predetermined distance away from said light emitting means, said light receiving means being divided into a first and second light receiving devices by a partition line, current signals, which vary depending on respective incident light intensities, being respectively outputted from said first and second light receiving devices;

first converter means for converting the current signal from said first light receiving device into a first voltage signal;

second converter means for converting the current signal from said second light receiving device into a second voltage signal; and differential amplifying means for differentially amplifying between the first and second voltage signals, wherein said error detection means outputs the error signal upon detecting that an output signal of said differential amplifying means does not fall in the predetermined range.

14. The optical disk apparatus as set forth in claim 13, wherein said error detection means includes means for comparing the output signal of said differential amplifying means with a reference signal, and outputs the error signal according to the compared result.

15. The optical disk apparatus as set forth in claim 13, wherein said control means includes:

third reference voltage generation means for generating a third reference voltage corresponding to a light beam intensity of recording and erasing operations;

fourth reference voltage generation means for generating a fourth reference voltage corresponding to a light beam intensity of reproducing operation;

switch circuit means for switching from the third reference voltage to the fourth reference voltage upon reception of the error signal; and means for carrying out automatic power control of the light beam which is projected onto the recording medium in accordance with an output signal of said switch circuit means.

16. The optical disk apparatus as set forth in claim 9, wherein said optical path changing means includes galvanic mirror means having a reflecting surface from which the light beam is reflected and an opposite surface which is opposite to said reflecting surface, further comprising:

light emitting means, on said opposite surface, for projecting light;

light receiving means for receiving the light from said light emitting means, said light receiving means being fixed so as to have a predetermined distance away from said light emitting means, said light receiving means being divided into a first and second light receiving devices by a partition line, current signals, which vary depending on respective incident light intensities, being respectively outputted from said first and second light receiving devices, said partition line extending to a direction substantially perpendicular to a rotation direction of said galvanic mirror means, first converter means for converting the current signal from said first light receiving device into a first voltage signal;

second converter means for converting the current signal from said second light receiving device into a second voltage signal;

differential amplifying means for differentially amplifying between the first and second voltage signals;

first reference voltage generation means for generating a first reference voltage;

second reference voltage generation means for generating a second reference voltage;

first comparator means for comparing an output signal inputted thereto with the first reference voltage;

second comparator means for comparing an output signal inputted thereto with the second reference voltage; and logical multiply operating means for operating logical multiply with respect to output signals of said first and second comparator means, wherein an output signal of said logical multiply operating means corresponds to the error signal.

17. The optical disk apparatus as set forth in claim 9 is used for recording, erasing, and reproducing of information to or from a magneto-optical disk.

18. The optical disk apparatus as set forth in claim 9, wherein a predetermined range is specified such that the light intensity of the light beam projected onto the recording medium changes within a range of five (5) percent.

19. A recording method of an optical disk comprising the steps of:

(a) preparing optical path changing means for changing an optical path of a light beam by rotating said changing means thereby leading the light beam onto the optical disk;

(b) recording or erasing of information by projecting a first light beam onto the optical disk through the optical path changing means;

(c) detecting a rotation angle of the optical path changing means, and judging whether or not the detected rotation angle falls in a predetermined range; and (d) stopping recording or erasing of information upon detecting that the detected rotation angle does not fall in the predetermined range in said step (c).

20. The recording method of an optical disk as set forth in claim 19, wherein the stopping recording or erasing of information in said step (d) is carried out by projecting a second light beam onto the optical disk by the use of the optical path changing means, the second light beam having a weaker light intensity than that of the first light beam, the second light beam making it impossible to carry out recording and erasing of information.

21. A recording method of an optical disk comprising the steps of:

(a) preparing optical path changing means for changing an optical path of a light beam by rotating said changing means, thereby leading the light beam onto the optical disk;

(b) reproducing of information by projecting a reproducing-use light beam onto the optical disk through the optical path changing means;

(c) detecting a rotation angle of the optical path changing means, and judging whether or not the detected rotation angle falls in a predetermined range; and (d) stopping reproducing of information upon detecting that the detected rotation angle does not fall in the predetermined range in said step (c).

* * * * *